(12) United States Patent
Park et al.

(10) Patent No.: US 8,516,053 B2
(45) Date of Patent: Aug. 20, 2013

(54) MULTIMEDIA PLAY APPARATUS AND METHOD

(75) Inventors: Sang Wook Park, Daejeon (KR); Noh Sam Park, Daejeon (KR); Jong Hyun Jang, Daejeon (KR); Kwang Roh Park, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 449 days.

(21) Appl. No.: 12/832,586

(22) Filed: Jul. 8, 2010

(65) Prior Publication Data

US 2011/0010774 A1 Jan. 13, 2011

(30) Foreign Application Priority Data

Jul. 13, 2009 (KR) ........................ 10-2009-0063702

(51) Int. Cl.
*G06F 15/16* (2006.01)
(52) U.S. Cl.
USPC ......................................... 709/205; 709/248
(58) Field of Classification Search
USPC .......................................... 709/248; 726/24
See application file for complete search history.

(56) References Cited

U.S. PATENT DOCUMENTS

| | | | |
|---|---|---|---|
| 2002/0186694 A1* | 12/2002 | Mahajan et al. | 370/390 |
| 2008/0034041 A1* | 2/2008 | Kang et al. | 709/205 |
| 2009/0112933 A1* | 4/2009 | Kato et al. | 707/104.1 |

FOREIGN PATENT DOCUMENTS

KR 10-0513290 8/2005

* cited by examiner

*Primary Examiner* — Wing F Chan
*Assistant Examiner* — David X Yi
(74) *Attorney, Agent, or Firm* — Nelson Mullins Riley & Scarborough LLP

(57) ABSTRACT

Provided are a multimedia play apparatus and method. The multimedia play apparatus and method enable synchronization between an audio and a video through existing multimedia play time information, and even in a multimedia service that simultaneously provides multimedia and a message, the multimedia play apparatus and method enable synchronization between multimedia and a message that occurs by terminal characteristics between different environments and different users on the basis of existing multimedia play time information and multimedia meaning information. Moreover, by performing synchronization between multimedia and a message on the basis of the multimedia meaning information, the multimedia play apparatus and method can prevent the damage of a multimedia service that provides multimedia and a message together because of a spoiler corresponding to a malicious message.

6 Claims, 6 Drawing Sheets

FIG.5

510 MULTIMEDIA REFERENCING VALUE    520 MULTIMEDIA MEANING METADATA

521 PRECEDING METADATA MEANING CORRELATION
522 MULTIMEDIA TIME MEANING DATA

| Metadata Reference | Inaugurated Metadata |
|---|---|
| CH.7.KBS1.19:12.01 | `<?xml version="1.0" encoding="UTF-8"?>`<br>`<SEM>`<br>  `<EffectPropertyType="Baseball" EffectID="Baseball_SBS_0905251600">`<br>    `<hit>`<br>      `<positive><ㅅ><ㅅ><ㅈ></positive>`<br>      `<negative><아><휙></netative>`<br>    `</hit>`<br>  `</EffectPropertyType>`<br>  `<EffectVariableRefEffectID="Baseball_SBS_0905251600">`<br>    `<SEFragment SEFragmentID="Baseball_SBS_0905251600_1" start="T00:07:12:00">`<br>      `<hit>`<br>    `</SEFragment>`<br>  `</EffectVariable>`<br>`</SEM>` |
| CH.7.KBS1.19:12.01 | `<EffectVariable RefEffectID="Baseball_SBS_0905251600">`<br>  `<SEFragment SEFragmentID="Baseball_SBS_0905251600_1" start="T00:07:15:90">`<br>    `<out>`<br>  `</SEFragment>`<br>`</EffectVariable>` |

MULTIMEDIA PLAY APPARATUS AND METHOD

CROSS-REFERENCE TO RELATED APPLICATIONS

This application claims priority under 35 U.S.C. §119 to Korean Patent Application No. 10-2009-0063702, filed on Jul. 13, 2009, in the Korean Intellectual Property Office, the disclosure of which is incorporated herein by reference in its entirety.

TECHNICAL FIELD

The following disclosure relates to a multimedia play apparatus and method, and in particular, to a multimedia play apparatus and method, which exchange interactive messages between users that play and view together multimedia having multi audio/video tracks.

BACKGROUND

Recently, the types of multimedia are diversifying. Consumers for watching multimedia having the various types are widely using facilities such as theaters and home theaters.

With the advance of facilities such as theaters and home theaters, various reproduction technologies are being proposed. One video and audio are stored as respective tracks, and a multimedia player may synchronize time between the tracks and play the video and audio.

The direct participation and sharing of users are being increasingly required for multimedia. That is, new culture has happened in which while a user are receiving one multimedia service, another user simultaneously receiving the one multimedia service may form a bond of sympathy. For example, users do not merely watch pictures provided from a broadcasting station while viewing a sport game on a television (TV). The direct participation and sharing of the users are being achieved which exchange messages in real time, share the thoughts of the users and exchange their opinions.

However, difference exists in the absolute times of picture play according to the performance of the multimedia system of each user, and particularly, with the increase of terminals that use other networks like Internet Protocol Television (IPTV), multimedia service having a large capacity functions greater than the delay of message processing in a simple text level.

Accordingly, a system for playing and controlling multimedia and a multimedia apparatus, which provide a synchronization function for matching the play times of message tracks, are required. Moreover, technology compatible with the configuration of a related art player system is required.

SUMMARY

In one general aspect, a multimedia play apparatus includes: an audio/video track play unit playing multimedia, and outputting play time information of the multimedia and meaning information of the multimedia; and a message track play unit receiving a message data, and synchronizing the message data and data of the multimedia on the basis of the play time information and the meaning information of the multimedia.

In another general aspect, a multimedia play method includes: receiving a message data from a user-side system which participates in exchange of a message, and data of multimedia; playing, by an audio/video track play unit, the multimedia, and outputting play time information of the multimedia and meaning information of the multimedia; and receiving, by a message track play unit, the message data, and synchronizing the message data and the multimedia data on the basis of the play time information and the meaning information of the multimedia.

Other features and aspects will be apparent from the following detailed description, the drawings, and the claims.

BRIEF DESCRIPTION OF THE DRAWINGS

FIG. 5 is a diagram illustrating an example of meaning information of multimedia for performing meaning-based synchronization through a meaning-based synchronizer of FIG. 3.

DETAILED DESCRIPTION OF EMBODIMENTS

Figure 1:
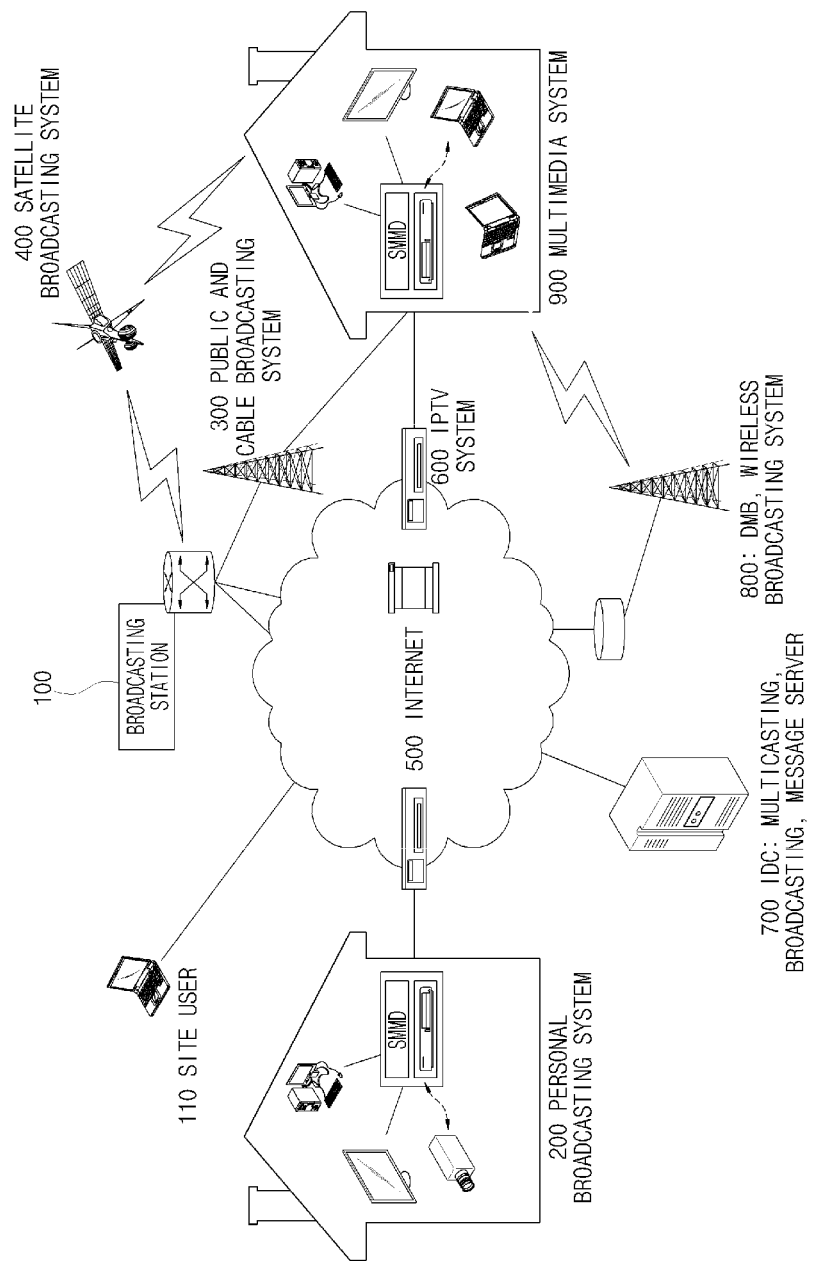
FIG. 1 is a diagram illustrating the structure of the existing multimedia service.

Hereinafter, exemplary embodiments will be described in detail with reference to the accompanying drawings. Throughout the drawings and the detailed description, unless otherwise described, the same drawing reference numerals will be understood to refer to the same elements, features, and structures. The relative size and depiction of these elements may be exaggerated for clarity, illustration, and convenience. The following detailed description is provided to assist the reader in gaining a comprehensive understanding of the methods, apparatuses, and/or systems described herein. Accordingly, various changes, modifications, and equivalents of the methods, apparatuses, and/or systems described herein will be suggested to those of ordinary skill in the art. Also, descriptions of well-known functions and constructions may be omitted for increased clarity and conciseness.

A multimedia play apparatus according to exemplary embodiments relates to a technology for scheduling and synchronizing messages and multimedia that are played by it. The existing multimedia service method for scheduling and synchronizing multimedia and messages mainly performs an operation for scheduling and synchronizing the multimedia and messages by a server. Accordingly, a user-side system may be recognized as manually receiving service, but the multimedia play apparatus according to exemplary embodiments gives an operational role to clients with the advance of the computing powers of the clients, and thus enables large-scale access and message exchange, thereby decreasing the loads of servers. Particularly, messages may be commonly exchanged and independent scheduling synchronization may be performed according to users' intention.

Moreover, a related art multimedia service method for scheduling and synchronizing multimedia and messages cannot propose a measure for preventing the exchange of malicious message data such as spoilers. Consequently, the multimedia play apparatus according to exemplary embodiments proposes a measure for avoiding the exchange of the malicious message data such as the spoilers.

Hereinafter, before the description of exemplary embodiments, a related art multimedia service method will first be described for clearly showing a difference between the existing multimedia service and a multimedia service according to exemplary embodiments.

FIG. 1 is a diagram illustrating the structure of the existing multimedia service.

Referring to FIG. 1, the existing multimedia service includes a service where data generated by a broadcasting station 100 is played in a multimedia system 900 through a public and cable broadcasting system 300, a service using a satellite broadcasting system 400, a service using an IPTV system 600 and an IDC 700 in an environment where infrastructures such as the Internet 500 are installed, a service that may be received/provided in vehicles and hand phones through a Digital Multimedia Broadcasting (DMB) and wireless broadcasting system 800, a service that broadcasts simple User Created Contents (UCC) through a personal broadcasting system 200, and a multimedia service that captures and shows multimedia, which is provided through a self-TV receiver, in simple software.

Multimedia contents provided through the above-described services are the same, but a multimedia service using systems, networks and hardware terminals based on different schemes is being provided.

Moreover, a user system 110 for generating multimedia contents in real time, sharing and exchanging messages in real time prepares a service that shares messages with systems, networks and hardware terminals based on different schemes. Recently, users participating a multimedia service use a message interactive service together for reciprocal participation and collaboration, like the philosophy of Web 2.0.

Figure 2:
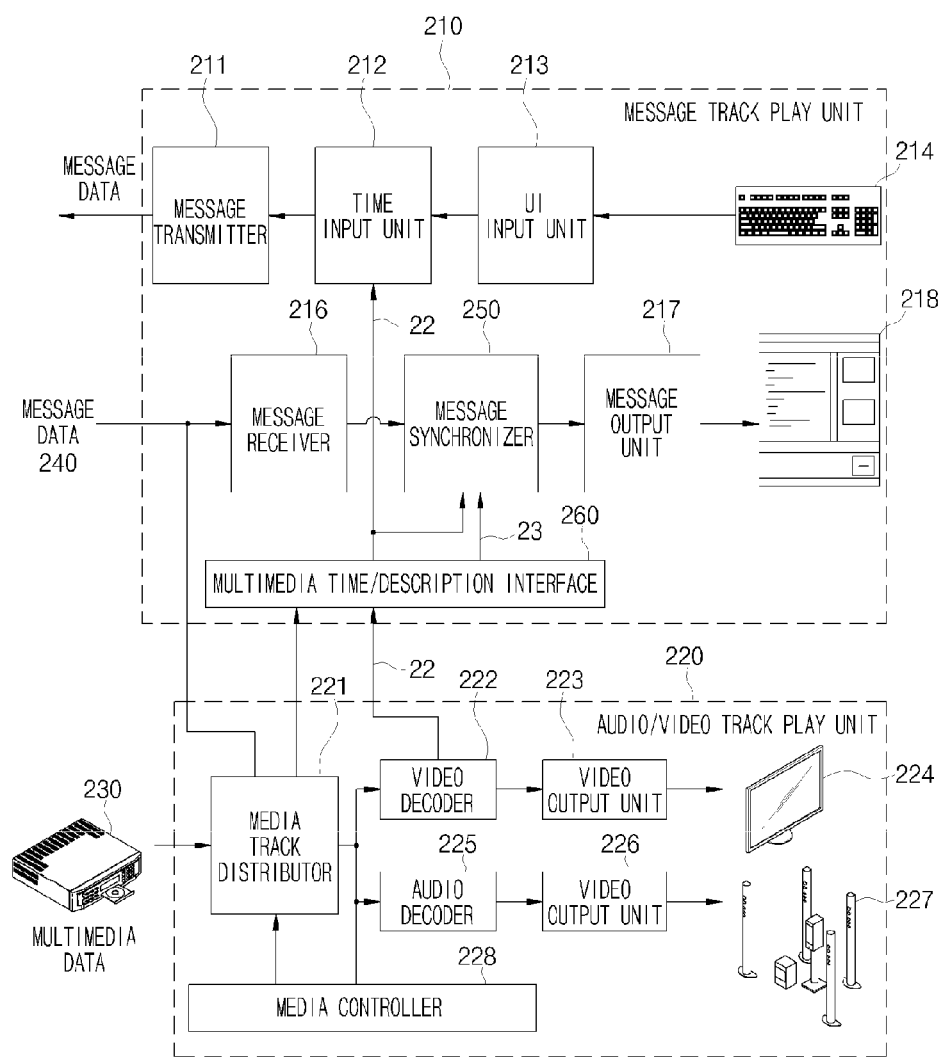
FIG. 2 is a block diagram illustrating a multimedia play apparatus according to an exemplary embodiment.

FIG. 2 is a block diagram illustrating a multimedia play apparatus according to an exemplary embodiment.

Referring to FIG. 2, a multimedia play apparatus according to an exemplary embodiment includes a message track play unit 210, and an audio/video track play unit 220.

The message track play unit 210 synchronizes a message data 240 with a multimedia data through an arbitrary user-side system that participates in the exchange of messages, and transmits a message data, which is generated by its own system, to another arbitrary user-side system for participating in the exchange of messages. For this, the message track play unit 210 includes a message transmitter 211, a time input unit 212, a User Interface (UI) input unit 213, a message receiver 216, a message synchronizer 250, a message output unit 217, and a multimedia time/description interface 260.

The audio/video track play unit 220 plays multimedia in which a message data is synchronized with a multimedia data. For this, the audio/video track play unit 220 includes a media track distributor 221, a video decoder 222, an audio decoder 225, a video output unit 223, an audio output unit 226, and a media controller 228. Herein, a multimedia data inputted to the audio/video track play unit 220 may include an audio data, a video data, a message data 240 and metadata for describing the meaning of the multimedia data.

Hereinafter, for convenience, the audio/video track play unit 220 will first be described.

The media track distributor 221 receives the multimedia data 230 to divide the multimedia data 230 into a video track and an audio track, and extracts the message data 240 and the metadata that are included tin the multimedia data 230. The extracted message data 240 is inputted to the message receiver 216 of the message track play unit 210. The extracted message data 240 may be inputted to the message receiver 216 through the multimedia time/description interface 260 of the message track play unit 210. Accordingly, the message track play unit 210 may receive the message data 240 through the audio/video track play unit 220, or may separately (or indirectly) receive the message data 240 even without passing through the audio/video track play unit 220. Moreover, the metadata extracted by the media track distributor 221 is provided to the time input unit 212 through the multimedia time/description interface 260 of the message track play unit 210.

The video track divided by the media track distributor 221 is decoded by the video decoder 222, and the decoded video track is outputted to a picture display unit 224 such as a screen through the video output unit 223. Herein, the media track distributor 221 transfers metadata included in the multimedia data 230 to the message track play unit 210. Moreover, the video decoder 222 transmits play time information 22, in which multimedia including audio and video is be played, to the message track play unit 210.

The audio track divided by the media track distributor 221 is decoded by the audio decoder 225, and the decoded audio track is outputted to an audio unit 227 including a speaker through the audio output unit 226.

The media controller 228 controls the overall operations of the media track distributor 221, video decoder 222 and audio decoder 225 to perform a control function such as the start, stop and pause functions of video/audio.

Hereinafter, the message track play unit 210 will be described in detail.

The message receiver 216 receives and processes a message data. At this point, as described above, the message receiver 216 receives the message data 240 through the media track distributor 221 of the audio/video track play unit 220, or separately receives the message data 240. The received message data 240 is transferred to the message synchronizer 250.

The message synchronizer 250 receives the multimedia play time information 22 and the meaning information of multimedia 23 from the audio/video play unit 220 through the multimedia time/description interface 260. Accordingly, the message synchronizer 250 synchronizes the message data 240 with a picture that is displayed through the display unit 224 of the audio/video track play unit 220, on the basis of the received play time information 22 and the meaning information of multimedia 23.

The message output unit 217 outputs a message picture 218 that is synchronized with a picture displayed by the display unit 224 and displays the message picture 218 to a user.

The UI input unit 213 receives a message data that is written by a user participating in the exchange of messages, through the message input unit 214.

Figure 4:
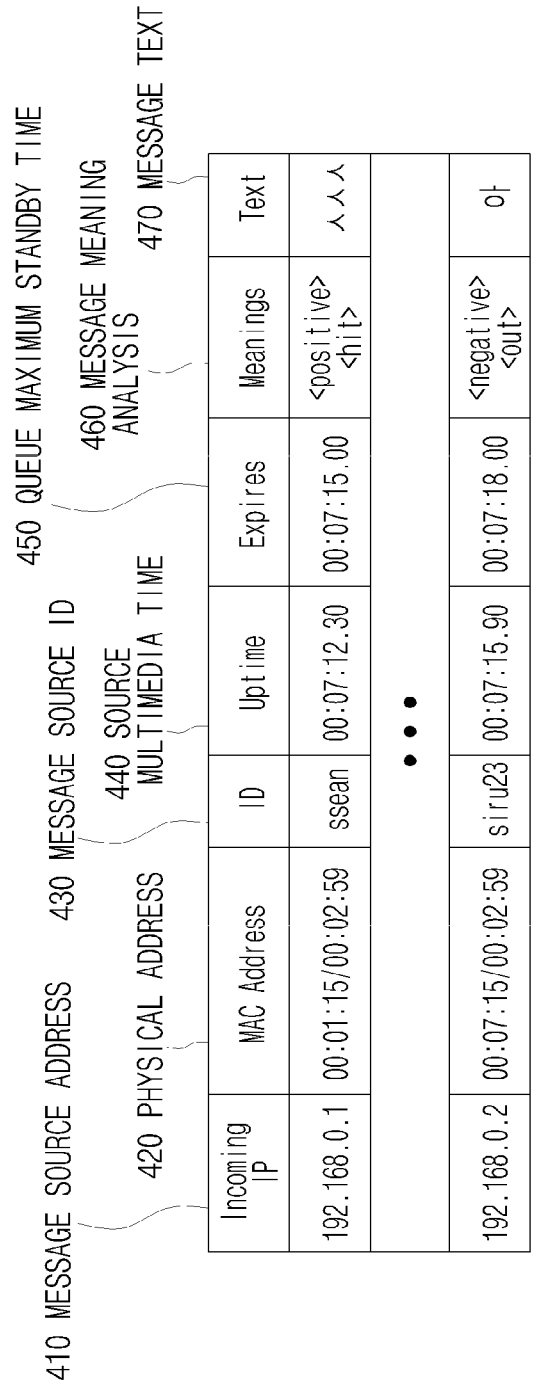
FIG. 4 is a diagram illustrating an example of a schema of a message which is stored in a message queue for storing a message scheduled and doubted.

The time input unit 212 receives the multimedia play time information 22 used in the video decoder 222 through the multimedia time/description interface 260, and reconfigures the message data 240 inputted from the UI input unit 213 on the basis of the received multimedia play time information. That is, as illustrated in FIG. 4 below, the time input unit 212 divides the message from the UI input unit 213 into an address 410 of a message information writer, a physical address 420, an identification (ID) 430 of the message information writer, a multimedia play time information 440, a maximum standby time 450 of a queue, a meaning 460 of message information and a text 470 of the message information and reconfigures the message.

In the message transmitter 211, as illustrated in FIG. 1, the reconfigured message data is transmitted to a message server 700 over a network.

Figure 3:
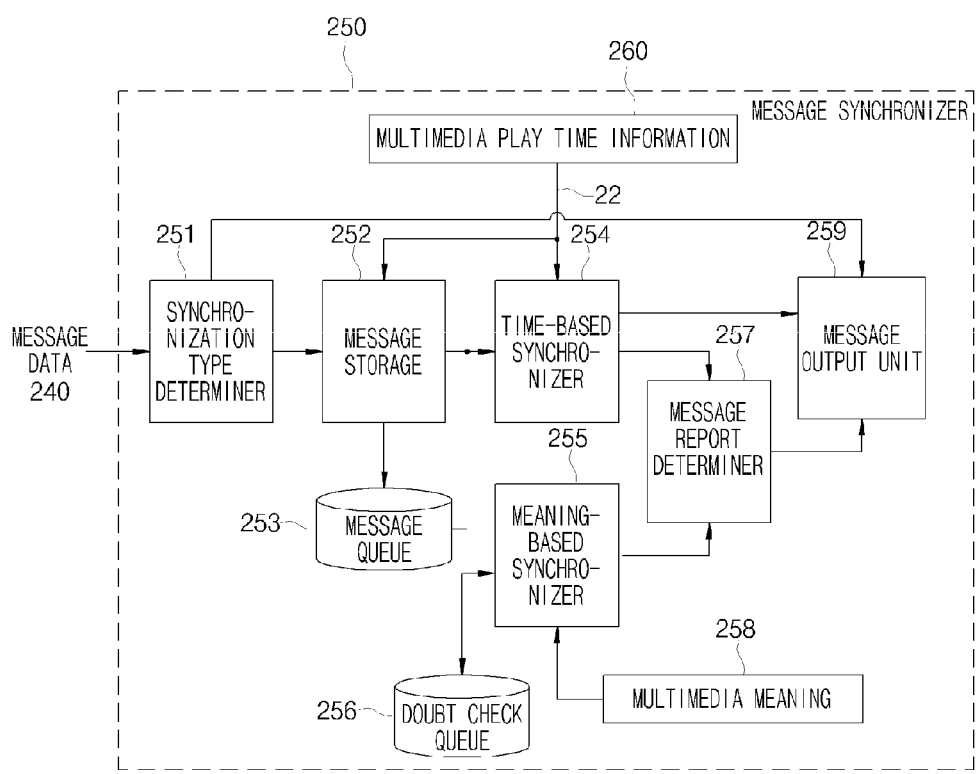
FIG. 3 is a block diagram illustrating the internal configuration of a message synchronizer in FIG. 2.

FIG. 3 is a block diagram illustrating the internal configuration of the message synchronizer in FIG. 2.

Referring to FIG. 3, the message synchronizer 250 performs the synchronization and scheduling function of messages. For this, the message synchronizer 250 includes a synchronization type determiner 251, a message storage 252, a message queue 253, a time-based synchronizer 254, a meaning-based synchronizer 255, a doubt check queue 256, a message report determiner 257, and a message output unit 259.

First, the synchronization type determiner 251 receives the message data 240 and determines whether to perform a synchronization type based on a user's preference and environment setting. When whether to perform a synchronization type based on a user's preference and environment setting is determined, the synchronization type determiner 251 determines whether to perform a time-based synchronization type or a meaning-based synchronization type.

When the synchronization type of messages is not performed, a received message is displayed as the message picture 218 of FIG. 2 by the message output unit 259.

When the user intends to synchronize the message data 240 with a multimedia data through a synchronization type, the message storage 252 stores a message in the message queue through a type as illustrated in FIG. 4.

The time-based synchronizer 254 schedules a time when the message stored in the message queue 253 is outputted, on the basis of the multimedia play time information 440 that is provided through the multimedia time/description interface 260. Therefore, the time-based synchronizer 254 prevents a message from being outputted before a picture that is delayed and played by another user-side multimedia play system.

When the multimedia data 230 of FIG. 2 includes the meaning information of multimedia, the meaning-based synchronizer 255 compares the meaning information with the meaning of a message that is transferred from an arbitrary user-side system, and filters or schedules a malicious message such as a spoiler according to the compared result. For example, the user of the personal broadcasting system 200 in FIG. 1 may watch a multimedia service, which is broadcasted by it, over a network before the multimedia service is transmitted to another reception user, and may quickly provide the multimedia service through a message without intention. At this point, a user that receives message information including the multimedia play time information 440 waits by for a delayed time and outputs a corresponding message on the basis of play time information that is relatively delayed in the its own multimedia play system, and thus the message is synchronized with multimedia that is transmitted by another user.

When it is impossible to perform synchronization with time information, for example, the user system 110 of FIG. 1 being a site user-side system does not receive a multimedia service, and when desiring a message information exchange service while actually watching a sport game in a site, the site user-side system 110 may not determine a message creation time. Accordingly, the site user-side system 110 determines the meaning of messages and performs synchronization between the messages.

When malicious, a message exchange system views multimedia through a personal computer or an IPTV where delay occurs greatly, but it may serve as a spoiler that knows beforehand the result of a multimedia data through the other channel of public broadcasting or radio and maliciously leaks a message to another user. At this point, the meaning-based synchronizer 255 of FIG. 3 analyzes the message meaning of a spoiler (or "fishing message" that is commonly called on the Internet) that maliciously leaks the meaning of a message, and compares the analyzed message meaning of the spoiler and the meaning information 258 of the multimedia of the multimedia data 230 (see FIG. 2). When it is determined that a message reception user is maliciously affected as the compared result, the analyzed message of the spoiler is stored the doubt check queue 256.

The message report determiner 257 determines whether to report a user corresponding to a spoiler and the message of a spoiler, and transfers the determined result to the message output unit 259 being a final message output unit.

FIG. 4 is a diagram illustrating an example of a schema of a message which is stored in a message queue for storing a message scheduled and doubted.

Referring to FIG. 4, a message includes an Internet Protocol (IP) address 410 (a message source address: an incoming IP) of a message-sending user, a physical address 420 (an MAC address) for authentication, a message source ID 430 for the identification of a user, the multimedia play time information 440 (Uptime) of another user where a message is created, the queue maximum standby time 450 (Expires), the message meaning information 460 (Meanings) where a message meaning is analyzed, and the text 470 being the message original.

FIG. 5 is a diagram illustrating an example of meaning information of multimedia for performing meaning-based synchronization through the meaning-based synchronizer 255 of FIG. 3.

Referring to FIG. 5, multimedia meaning information includes a multimedia referencing value 510 and a multimedia meaning metadata 520, for securing connection between various multimedia play apparatuses that provide multimedia services.

The multimedia meaning metadata 520 includes a preceding metadata 521 and a time meaning data 522, for preparing against that the contents of a multimedia service proceed variously with the elapse of time.

The preceding metadata 521 defines the description information of multimedia to be used in the future. For example, in the case of a multimedia service for a baseball game among sport games, a hit is represented as <hit>, and the support team of an attack team that makes a hit sends a positive message. On the other hand, a defense team sends a negative message, and thus correlation between these is defined.

As described above, <hit> includes time information, which occurs when a multimedia service is actually provided, in <start> 52 and thereby is transmitted to a user as multimedia description information for the multimedia. At this point, the media track distributor 221 of FIG. 2 receives the metadata included in the multimedia data 230 transmits information, in which a current multimedia state is <hit>, to the message synchronizer 250 through the multimedia time/description interface 260.

Figure 6:
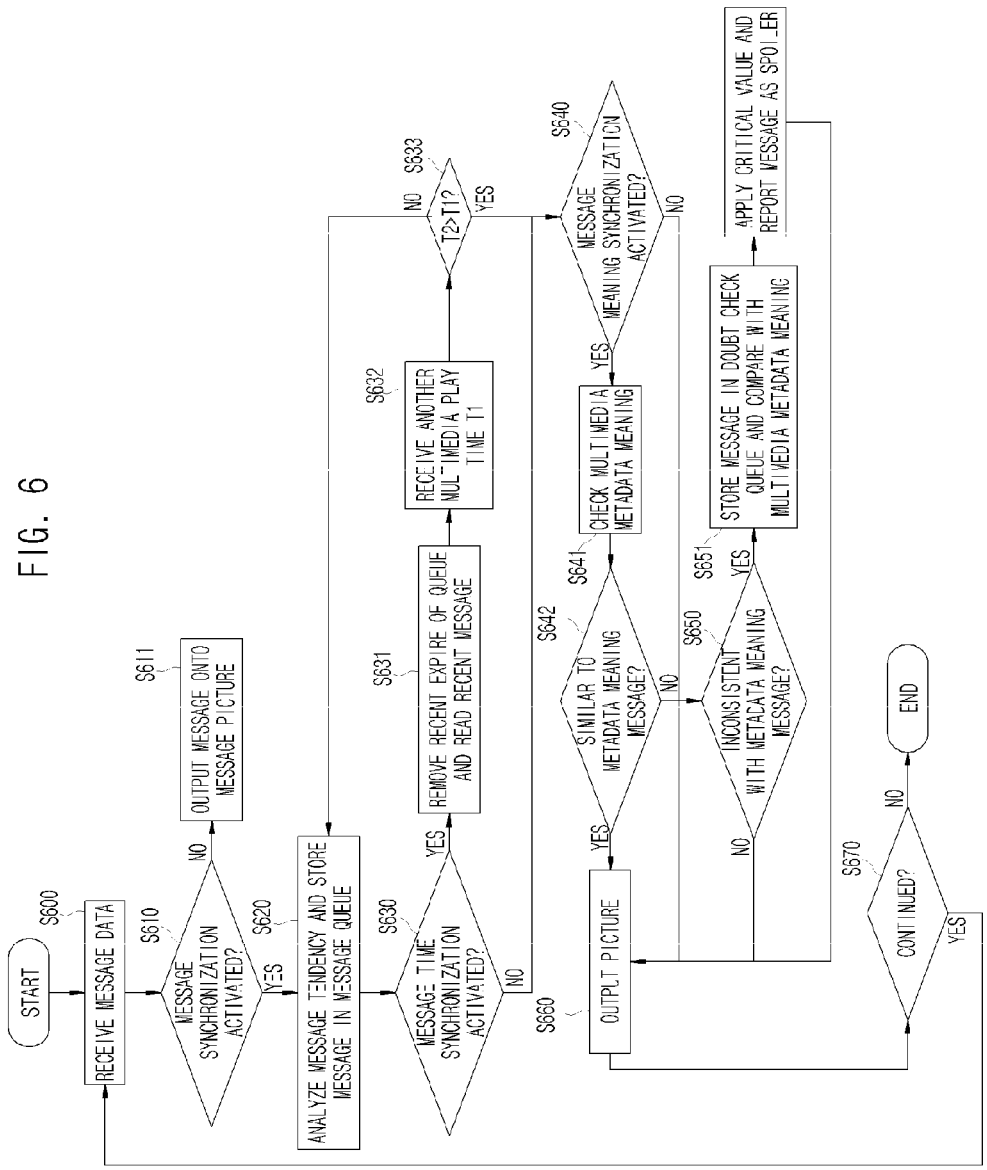
FIG. 6 is a flowchart illustrating a message synchronization and scheduling operation which is performed by a message synchronizer of FIG. 3.

FIG. 6 is a flowchart illustrating a message synchronization and scheduling operation which is performed by the message synchronizer of FIG. 3.

Referring to FIGS. 6 and 3, when the message synchronizer 250 receives a message data in operation S600, the synchronization type determiner 251 determines whether to activate message synchronization in operation S610.

When message synchronization is deactivated in operation S610, a corresponding message is outputted on a picture through the message output unit 259 in operation S611.

When message synchronization is activated in operation S610, i.e., when message synchronization is activated according to a user's preference, the message synchronizer 250 analyzes a message tendency on the basis of the meaning connection of the preceding metadata 521 of FIG. 5, creates information illustrated in FIG. 4, and stores the created information and the message text 470 in the message queue 253 in accordance with the items 410, 420, 430, 440, 450, 460 and 470 in operation S620.

A message stored in the message queue 253 waits and then is outputted in accordance with the picture play time of the audio/video track play unit 220 when its own multimedia service is not delayed or a delay time is applied. For this, the message synchronizer 250 determines whether to activate synchronization between the multimedia service and a message time in operation S630.

The message synchronizer 250 reads data to be processed in the message queue 253 at a multimedia play time for synchronizing the multimedia service and the message time in operation S631.

The message synchronizer 250 receives another multimedia play time T1 stored in a message data in operation S632, and it compares the received other multimedia play time T1 and its own multimedia play time T2 in operation S633.

When the multimedia play time T1 is greater than the multimedia play time T2 (T2>T1) as the compared result of operation S633, the message synchronizer 250 determines that its own multimedia service is delayed. Accordingly, a corresponding message is continuously kept in the message queue 253 in operation S620.

When another message play time is determined as being synchronized with the multimedia service play time of the message synchronizer 250 in operation S633, the message synchronizer 250 determines whether to activate the synchronization of message meaning in operation S640.

When the synchronization of the message meaning is activated in operation S640, the message synchronizer 250 fetches the meaning information of metadata of FIG. 5 through the multimedia time/description interface 260 and checks the meaning of current metadata in operation S641.

On the other hand, when message meaning synchronization is deactivated in operation S640, a corresponding message is synchronized and is outputted onto a picture in operation S660.

When the meaning of metadata is similar to the meaning of another message, a corresponding message is outputted onto a picture in operation S660. When the meaning of metadata is not similar to the meaning of another message, the message synchronizer 250 determines whether the meaning of metadata is inconsistent with the meaning of a message in operation S650.

When the determined result corresponds to the meaning correlation of the preceding metadata of FIG. 5, the message synchronizer 250 stores a message in the doubt check queue 256 of FIG. 3 to check a critical value, and ignores or reports the message as a spoiler in operation S651. For example, a user ID that disseminates a malicious message stored in the doubt check queue 256 is checked, and when the number of check times for the user ID disseminating the malicious message exceeds a predetermined critical value, the user ID disseminating the malicious message and the malicious message disseminated by the user ID are reported to each user-side system or server-side system.

When there is no correlation or probability between multimedia and a message, the message synchronizer 250 determines message exchange as general message exchange and outputs the message on a picture in operation S660. For example, in a multimedia service for a current baseball game, when a thrilling contest between a pitcher and a batter is being made in a <ball> or <strike> state, if a message such as <homerun> and <out> is transmitted although before different results are still obtained for a message creation time, the message may be one corresponding to a spoiler. Accordingly, a corresponding message is stored in the doubt message queue 351 and is scheduled until a next state arrives, and then it is outputted, thereby preventing intentionally hindering the multimedia service viewing of a user.

By notifying a manager or a user of a user which is repeatedly stored in the doubt check queue 256 of FIG. 3 through warning, a report may be made.

A number of exemplary embodiments have been described above. Nevertheless, it will be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A multimedia play apparatus, comprising:
   an audio/video track play unit for playing multimedia, and outputting play time information of the multimedia and meaning information of the multimedia; and
   a message track play unit for receiving a message data, and synchronizing the message data and data of the multimedia on the basis of the play time information and the meaning information of the multimedia,
   wherein the message track play unit comprises:
   a message input unit for receiving a message data which is transmitted from a user-side system participating in exchange of a message;
   a time input unit for receiving the message data through a user interface, and dividing the received message data into a message address, a physical address (MAC address), a identification (ID) of a user writing a message, a meaning of a message and a text of a message to reconfigure the message data, on the basis of the play time information of the multimedia which is provided from the audio/video track play unit;
   a message transmitter transmitting the reconfigured message data to the user-side system which participates in the exchange of the message;
   a message receiver receiving a message data from an arbitrary user-side system which participates in exchange of a message data;
   a message synchronizer receiving the play time information and the meaning information of the multimedia data from the audio/video track play unit, and performing a time-based synchronization operation and meaning-based synchronization operation between the received message data and the multimedia; and
   a message output unit for outputting the received message data which is synchronized through the time-based synchronization operation and the meaning-based synchronization operation.

2. The multimedia play apparatus of claim 1, wherein the audio/video track play unit receives a multimedia data comprising metadata which corresponds to video information, audio information and the meaning information of the multimedia, and outputs a picture where the message data and the multimedia are synchronized by the message track play unit.

3. The multimedia play apparatus of claim 1, wherein the message synchronizer comprises:
   a synchronization type determiner determining whether to perform a synchronization operation between the message data and the multimedia based on a user's preference and environment setting, and determining any one of the time-based synchronization operation and the meaning-based synchronization operation when performing the synchronization operation;

a message storage storing an Internet Protocol (IP) address of a user which writes a received message data into a message, a physical address (MAC address), an identification (ID) of a message writer, multimedia play time information, a maximum standby time (Expires) of a queue, a meaning of a message and a text of message information which are divided when performing the synchronization operation, in a message queue;

a time-based synchronizer scheduling a time when the message data stored in the message queue is outputted and synchronizing the stored message data at a time when the multimedia is outputted, on the basis of the play time information from the message track play unit;

a meaning-based synchronizer comparing the multimedia meaning information and the meaning of the message transmitted from the arbitrary user-side system on the basis of the multimedia meaning information from the message track play unit, and storing a malicious message in a doubt check queue when the message transmitted from the arbitrary user-side system is the malicious message different from the multimedia meaning information as the compared result; and a message report determiner reporting a corresponding user of the malicious message which is repeatedly stored in the doubt check queue.

4. The multimedia play apparatus of claim 3, wherein the message report determiner checks an ID and IP address of a corresponding user disseminating a malicious message which is repeatedly stored in the doubt check queue, and reports the corresponding user to a corresponding user-side system and server-side system when the number of check times for the corresponding user exceeds a predetermined critical value.

5. A multimedia play method, comprising:

receiving a message data from a user-side system which participates in exchange of a message, and data of multimedia;

playing, by an audio/video track play unit, the multimedia, and outputting play time information of the multimedia and meaning information of the multimedia; and receiving, by a message track play unit, the message data, and synchronizing the message data and the multimedia data on the basis of the play time information and the meaning information of the multimedia, wherein the synchronizing of the message data and the multimedia data comprises:

receiving the message data which is transmitted from the user-side system participating in the exchange of the message;

receiving the message data through a user interface, and dividing the received message data into an Internet Protocol (IP) address of a user writing the message data, a physical address (MAC address), a identification (ID) of a user writing a message, a meaning of a message and a text of a message to reconfigure the message data, on the basis of the play time information of the multimedia which is provided from the audio/video track play unit;

transmitting the reconfigured message data to another user-side system which participates in the exchange of the message;

storing the received message data in a message queue;

synchronizing a message stored in the message queue with the play time information of the multimedia to output the received message data;

comparing the meaning information of the multimedia with meaning information of a message data which is transmitted from an arbitrary user-side system participating in exchange of the message data; and outputting the message data onto a picture of a corresponding user-side system, when the meaning information of the multimedia is similar to the meaning information of the message data which is transmitted from the arbitrary user-side system participating in exchange of the message data.

6. The multimedia play method of claim 5, wherein the comparing of the meaning information of the multimedia with meaning information of a message data comprises: determining the meaning information of the message data which is transmitted from the arbitrary user-side system as a malicious message data, when the meaning information of the multimedia is not similar to the meaning information of the message data which is transmitted from the arbitrary user-side system participating in exchange of the message data; storing the determined malicious message data in a doubt check queue; and checking an ID and IP address of the arbitrary user which writes a malicious message data stored in the doubt check queue, and notifying a corresponding user-side system, which receives the malicious message data, of the checked ID and IP address when the number of check times for the ID and IP address of the arbitrary user exceeds a predetermined critical value.

* * * * *